R. JOHN.
METHOD OF TAKING MOVING PICTURES.
APPLICATION FILED FEB. 2, 1915.

1,216,695.    Patented Feb. 20, 1917.

UNITED STATES PATENT OFFICE.

ROBERT JOHN, OF NEW YORK, N. Y.

METHOD OF TAKING MOVING PICTURES.

1,216,695.  Specification of Letters Patent.  Patented Feb. 20, 1917.

Application filed February 2, 1915. Serial No. 5,605.

*To all whom it may concern:*

Be it known that I, ROBERT JOHN, a citizen of the United States, residing at New York city, in the borough of Manhattan and State of New York, have invented certain new and useful Improvements in Methods of Taking Moving Pictures, of which the following is a full, clear, and exact description.

This invention relates to motion photography and resides in a method of making reel pictures for projection upon a screen to depict or portray the act of drawing or sketching a pictorial representation upon a surface, which will appear to an observer as if original lines of various shades and graduations were actually imparted to a blank surface.

During the more recent development of the motion picture art there has sprung up a demand for reel pictures which, when projected upon a screen, will depict an artist in the act of making a cartoon, or like representation. These pictures have heretofore been made by taking successive photographs of an artist in the act of making an original drawing or representation. This method of procedure is objectionable as it requires the artist to work under high nervous tension. The strain on the artist results from the fact that he must time his strokes so that they may be taken by the camera instead of using the natural speed at which he would ordinarily make such a drawing or representation, and from the fact that he is working under conditions which make it imperative for him to be extremely accurate with each of his strokes, for if he misplaces a line or desires to change the picture in any way it is necessary to stop the camera to permit him to erase a line, and then go back and start the picture from the then completed point. On the part of the person obtaining the picture this method is expensive and tedious because it necessitates the constant attendance of a motion picture camera and its operator while the artist is drawing the picture, sometimes for a period of two or three days, due to various "stops" and "cut outs". Moreover, the completed reel for projecting purposes must be made from the photographs taken by leaving out the portions of the reel where mistakes have been made by the artist and patching together the remainder so as to make the action of the artist appear as if it were continuous. These objections have had the effect of retarding the development of this phase of the motion picture art; indeed up to the present time this branch of the art has been restricted to the portrayal of an artist making sketches, such as cartoons and the like, which show merely a simple outline and comparatively little detail.

It is the purpose of my invention to avoid these difficulties and to increase the scope of this phase of motion picture photography by utilizing a finished original drawing or sketch as a guide or foundation from which a reel picture may be taken of the act of drawing or tracing the original lines in such a way that the deception will not be apparent to an observer when the picture is projected upon a screen. Any form of surface representation such as a painting, photograph, etching, etc., may therefore be used.

Broadly stated, my improved method comprises utilizing a surface having an impression thereon which is visible to the naked eye if viewed at close range and at an angle to the surface, but is invisible to the camera. That is, if a photograph be taken of the same from a point in front of the surface, the film will not be affected, and when the photograph is projected upon the screen a perfectly blank background will appear. Successive photographs are taken of the surface as the lines of the picture are traced by a person standing at one side of it, and means are employed to render the lines of the picture capable of being photographed by the camera while they are being traced. When a reel picture produced in this manner is thrown upon a screen its appearance will be identically the same as if the lines were being originally drawn by an artist instead of being traced during the photographic operation.

In carrying out this general method practically, I find it preferable to employ a photographic print of the desired impression and chemically treat the same to produce the results above mentioned. The first step is to make a positive bromid enlargement of the subject, that is, one having black lines upon a white ground. The subject may consist of any object which is capable of being photographed, and is not limited to sketches or drawings of simple outline. The print is then bleached by chemical means to a uniform white color. In bleaching, however, the following should be observed: The image upon the print must be completely bleached out without destroying or injuring its capability of being recomposed; care must be exercised in selecting a bleaching solution which will not affect the gelatinous surface of the print and thereby form a relief which is capable of being photographed; and the solution which is used to bleach the image must be such that when it is subjected to the light necessary to take the photographs it will not again cause the lines of the image to appear or recompose. By proceeding as follows, satisfactory results may be obtained.

The bromid positive print which has been fully developed and thoroughly fixed as well as washed and dried, is first bleached in a solution of water, mercuric chlorid and hydrochloric acid, is afterward washed in separate solutions of water and hydrochloric acid and is then given a final bath in water, potassium bichromate and sulfuric acid, wherein it is permitted to remain for several minutes, after which it is washed, rinsed in clear water, and dried. The purpose of the last bath is two-fold. When a bromid print is bleached in mercuric chlorid there is a tendency for the lines to redevelop when subjected to the strong light necessary in photography. The solution of potassium bichromate greatly reduces this tendency, although the lines will again become visible to a slight extent and have a light yellow tinge. The potassium bichromate colors the background a light yellow, which, when the picture comes from the bath, is somewhat darker than the lines which have been bleached out. When the surface is exposed to light the bleached lines tend to take on a darker yellow tint, which is practically the same as the background. By thus treating the print it is possible to take a photograph of the same and project it upon a screen without showing any lines which will indicate the presence of a latent image thereon. Moreover, the projected photograph will appear to the observer of the picture as a perfectly blank surface, the yellow tint of the bleached print when projected, showing as practically pure white. In taking photographic images of this surface the camera should be placed directly in front of the surface, and in this manner the reflected light from this surface, which affects the sensitive film within the camera will be practically uniform, and no lines will appear on the film. This is what I regard as treating a surface to make it "invisible" to the camera, and I will hereinafter refer to it in this manner in the specification and claims. The image upon the surface is still visible to the naked eye, however, if viewed at an angle to the surface.

The surface or print which has been treated in this manner is then placed upon an easel and the lines of the image which are latent are recomposed or brought back to the same shade and graduation of blackness as that of the original print. The restoration or recomposition of the picture is accomplished by a person who stands to one side of the surface where he can trace separately each line of the picture and simulate, in so doing, the stroke which an artist would make in the actual drawing of the line. The object which he uses to trace the line should be similar in shape to the brush or pencil which an artist would use, but instead of making a distinct and separate mark upon the paper or surface, it applies a fluid chemical to the print which reacts with the chemicals upon the surface of the print to cause the lines of the original picture to reappear. The movements required to trace the image are successively photographed and it is from the photographs thus taken that the negative is produced from which positives may be made and projected upon the screen in the usual manner.

In preparing the chemical which will cause the lines of the image to reappear upon the print it is necessary to use a developing agent which will work instantly so that the effect is the same as if the object which traces the line of the image carried ink or some other means for making a visible imprint upon the surface. The developing agent must also produce a black line so that it will form a better contrast with the white background than a brown or other colored one. Furthermore, the developing agent must not stain the print, for if it does the stain will be seen when the picture is projected upon the screen, which will lessen or completely destroy the deception. Lastly, the developing solution must cause the lines of the image to reappear in approximately the same graduation as the original, so that the shade lines and other portions of the picture will give the correct perspective. All of these points are cared for properly if a solution of ammonia is used in connection with a mercuric chlorid bleaching solution. The object which simulates the brush or pencil is therefore charged with a solution of ammonia so that as the object traces a line it will instantly restore the line to its original black color.

While the chemicals described by me have been found to be most efficacious, it is obvious that the invention is not limited in any manner to the use of these specific chemicals, as I have used as a bleaching solution potassium ferricyanid as well as mercuric chlorid. And to cause the picture to reappear after bleaching, hydrochinon, metol, rhodinal, amidol, eikonogen, pyrogallic acid, sodium sulfite or hypo-sulfite, or indeed any of the other well known chemical agents which will cause a deposit of the silver in the bromid print to appear upon the surface of the print, may be used.

The accompanying drawings are illustrative of the method as carried out in its preferred form.

Figure 1:
Figure 1 represents a black and white photographic print having an image or representation thereon.
Figure 2:
Fig. 2 shows the same image or representation in dotted lines to indicate that in this view the same is invisible to the camera.
Figure 3:
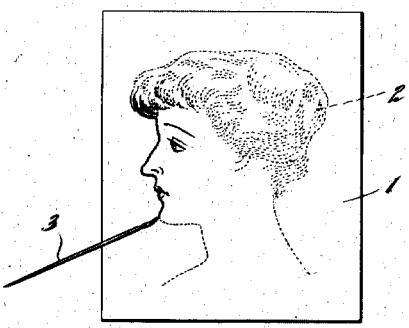
Fig. 3 shows the image or representation partly in full and partly in dotted lines.

In the drawing, 1 designates an ordinary black and white print having a representation or figure 2 thereon, the lines of which will be black, as shown in the drawing. This print is treated as before described, by a bleaching process, and the lines of the image are bleached out so that the same will be invisible to the camera but visible to an observer standing adjacent the print, but to one side thereof. To cause the image to reappear the picture or print is treated with a brush 3 dipped in ammonia or the other substances mentioned, and in Fig. 3 the profile of the face is shown in full lines to indicate that it has thus been treated.

Among other advantages of my improved method of procedure may be mentioned that where a photographic print of the object is taken and treated in the manner described, it is not necessary to employ the services of a high-priced artist to trace in the picture, as the lines may be traced by an unskilled person who can to a sufficient extent simulate the strokes which would be made by an artist. For even if he does not accurately follow the line he is tracing, the point of the tool or object with which he is tracing may be made sufficiently broad to cause the ammonia or other chemical used to spread over a sufficient area of the paper to cause the line to reappear. The picture may also be outlined or traced in a comparatively short period of time, and since there is no chance of mistakes being made the reel which is taken by the motion picture camera will be complete and need not be chopped up and patched together in order to portray the continuous action.

While I have described one specific way in which my improved method may be carried out, I do not wish to be limited thereto, as I regard my invention as contemplating and comprehending the broad idea of treating any surface representation so that it will be invisible to a camera and yet visible to the eye at close range, and so that it may be traced and the lines of the picture again made visible to the camera. It is my intention to be limited, therefore, only by the claims appended hereto.

I claim:

1. In a method of making moving pictures, the steps which comprise treating a surface having an impression thereon to render said impression invisible to the camera but visible to the eye, tracing the lines of said impression and simultaneously rendering the lines visible to the camera, and taking successive photographs of the surface during the tracing movements.

2. In a method of making moving pictures, the steps which comprise utilizing a surface having an impression thereon visible to the camera, treating said surface to render said impression invisible to the camera but visible to the eye, tracing the lines of the impression on said surface while simultaneously rendering them visible to the camera, and taking successive photographs of the surface during the tracing movements.

3. In a method of making moving pictures, the steps which comprise utilizing a surface having an impression thereon visible to the camera, chemically treating said surface to render said impression invisible to the camera, but visible to the eye, tracing the lines of the impression on said surface with a chemical solution to render them visible to the camera, and taking successive photographs of the surface during the tracing movements.

4. In a method of making moving pictures, the steps which comprise subjecting a photographic print of any desired subject to a treatment to render the lines thereof invisible to the camera but visible to the eye, tracing the lines of the image on said print and simultaneously rendering the lines visible to the camera, and taking successive photographs of the print during the tracing movements.

5. In a method of making moving pictures, the steps which comprise bleaching a photographic print of any desired subject to render the image thereon invisible to a camera but visible to the eye, tracing the lines of the image and simultaneously redeveloping them, and taking successive photographs of the print during the tracing movements.

6. In a method of making moving pictures, the steps which comprise bleaching a photographic print of any desired subject to render the image thereon invisible to a camera but visible to the eye, treating said print to cause said image to remain unaffected by photographic light, tracing the lines of the image and simultaneously redeveloping them, and taking successive photographs of the print during the tracing movements.

7. The method of making motion pictures to portray the operation of making drawings, pictures, or the like, which consists in first producing the drawing, then causing the lines of the same to become invisible to the camera, then causing the lines to become visible to the camera by successive separate strokes similar to those naturally made in producing the original drawing, and simultaneously taking reel pictures of the successive strokes.

8. The method which consists in producing a drawing, then causing the lines thereof to become invisible to the camera by bleaching the same with a chemical, then making separate succesive strokes thereon with a brush saturated in a solution of aqua ammonia and simultaneously taking reel pictures of the successive strokes.

In witness whereof, I subscribe my signature, in the presence of two witnesses.

ROBERT JOHN.

Witnesses:
WALDO M. CHAPIN,
JULE ZELENKO.